(12) United States Patent
Duparchy

(10) Patent No.: US 10,458,285 B2
(45) Date of Patent: Oct. 29, 2019

(54) DEVICE FOR CONTROLLING THE WORKING FLUID CIRCULATING IN A CLOSED CIRCUIT OPERATING ACCORDING TO A RANKINE CYCLE AND METHOD OF USING SAME

(75) Inventor: Alexandre Duparchy, Paris (FR)

(73) Assignee: IFP ENERGIES NOUVELLES, Rueil-Malmasison (FR)

( * ) Notice: Subject to any disclaimer, the term of this patent is extended or adjusted under 35 U.S.C. 154(b) by 857 days.

(21) Appl. No.: 12/775,508

(22) Filed: May 7, 2010

(65) Prior Publication Data
US 2010/0287920 A1  Nov. 18, 2010

(30) Foreign Application Priority Data
May 13, 2009 (FR) ...................... 09 02316

(51) Int. Cl.
*F01K 13/02* (2006.01)
*F01K 23/06* (2006.01)
*F02G 5/02* (2006.01)

(52) U.S. Cl.
CPC ............ *F01K 23/065* (2013.01); *F01K 13/02* (2013.01); *F02G 5/02* (2013.01); *Y02T 10/166* (2013.01)

(58) Field of Classification Search
CPC ........ F02B 53/00; F02B 53/02; F01C 11/004; F01K 13/02; Y02T 10/166
USPC ...................... 60/204, 645, 649; 62/118, 430
See application file for complete search history.

(56) References Cited

U.S. PATENT DOCUMENTS

| | | | | |
|---|---|---|---|---|
| 3,512,358 A | * | 5/1970 | Schmidt | F02C 1/10 376/322 |
| 4,047,005 A | * | 9/1977 | Heiser | F01K 23/108 290/40 R |
| 4,099,489 A | | 7/1978 | Bradley | |
| 5,338,177 A | * | 8/1994 | Le Touche | B29C 70/44 264/313 |
| 2004/0107700 A1 | * | 6/2004 | McClanahan | F01K 25/106 60/670 |
| 2004/0128999 A1 | * | 7/2004 | Bronicki | F01K 13/02 60/646 |
| 2005/0072170 A1 | * | 4/2005 | Taniguchi | B01D 5/0093 62/183 |
| 2007/0267089 A1 | * | 11/2007 | Gray | B01D 53/04 141/59 |
| 2009/0100845 A1 | * | 4/2009 | Amir | F01K 25/08 62/50.2 |

FOREIGN PATENT DOCUMENTS

FR  2 884 555 A1  10/2006

* cited by examiner

Primary Examiner — Lindsay M Low
Assistant Examiner — Omar Morales
(74) Attorney, Agent, or Firm — Fitch, Even, Tabin & Flannery LLP

(57) ABSTRACT

The present invention relates to a device for controlling the working fluid circulating in a closed circuit (10) operating according to a Rankine cycle, said circuit comprising a heat exchanger (22) for evaporation of said fluid, swept by a hot fluid (Ch) from a hot source (28), expansion means (30) for expanding the fluid in vapor form, a cooling exchanger (40) swept by a cold fluid (Fr) for condensation of the fluid in vapor form, and a circulation and compression pump (12) for the fluid in liquid form.
According to the invention, the device comprises means (54) of managing the mass of fluid contained in circuit (10).

14 Claims, 1 Drawing Sheet

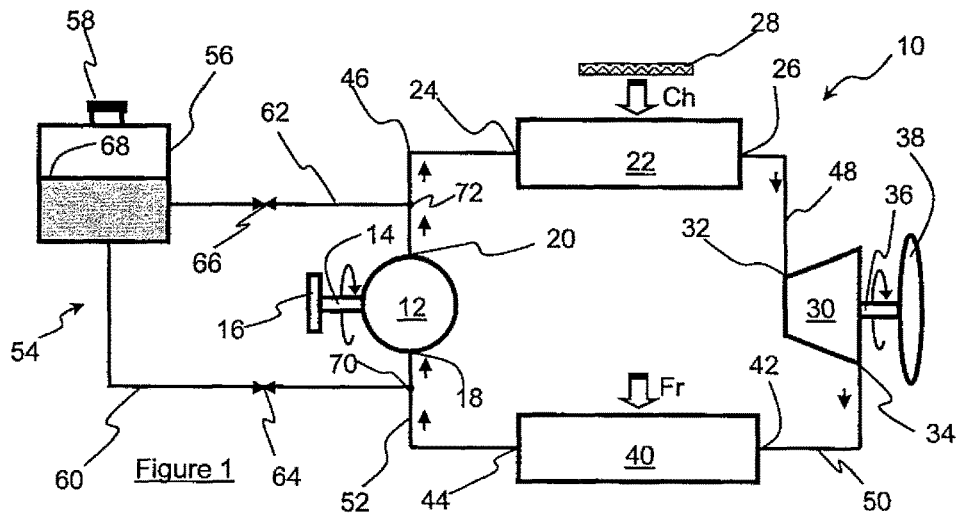
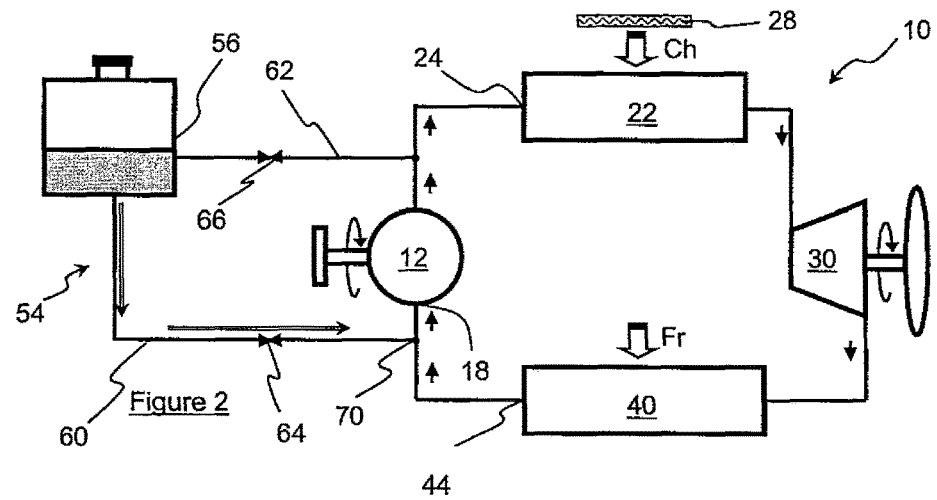
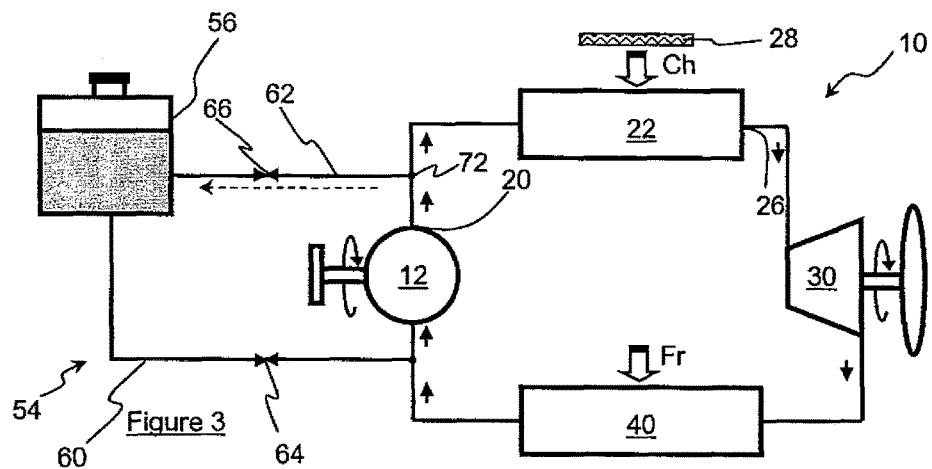

DEVICE FOR CONTROLLING THE WORKING FLUID CIRCULATING IN A CLOSED CIRCUIT OPERATING ACCORDING TO A RANKINE CYCLE AND METHOD OF USING SAME

FIELD OF THE INVENTION

The present invention relates to a device for controlling a closed circuit operating according to a Rankine cycle.

It more particularly relates to such a device associated with an internal-combustion engine, notably for motor vehicles.

As it is widely known, a Rankine cycle is a closed-circuit thermodynamic cycle whose specific feature is to involve a phase change (liquid/vapour) of a working fluid.

More precisely, this cycle can be broken down into four stages, one stage wherein the working fluid, in liquid form, is compressed in an isentropic manner, followed by a stage where the compressed liquid is heated and vaporized on contact with a source of heat, this vapour being expanded in an isentropic manner in an expansion machine during another stage, then the expanded working fluid is coded and condensed on contact with a cold source in a last stage.

To achieve this, the Rankine cycle closed circuit comprises a positive-displacement pump (or compressor) that compresses a phase-change working fluid in liquid form, which is generally water. This liquid flows through a heat exchanger (or evaporator) that is swept by a hot fluid. Due to the calorific exchange with this hot fluid, the liquid vaporizes and leaves the evaporator at least partly in vapour form. This vapour then flows through an expansion machine that converts the energy of this vapour into another energy such as a mechanical energy. The expanded vapour leaving the expansion machine flows through another heat exchanger (or condenser) by means of which the heat contained in the vapour is yielded to a cold fluid that sweeps this condenser. After flowing through the condenser, the working fluid is in liquid form, a form in which it is allowed into the compressor.

It is well known that the energy efficiency of internal-combustion engines, in particular those used for motor vehicles, has to be constantly improved. It is therefore particularly interesting to be concerned with the recovery of the thermal energies lost in such engines, notably in order to increase the efficiency thereof.

BACKGROUND OF THE INVENTION

Therefore, as better described in French patent application FR-2,884,555, one way of recovering these lost energies consists in using the exhaust gas of the internal-combustion engine to supply the heat source required for heating and vaporization of the working fluid in the Rankine cycle. A large part of the energy lost at the exhaust is thus recovered and it can be converted to an energy that is usable for the engine and/or the motor vehicle.

However, such a circuit configuration has the major drawback of being limited in its ability to use all the capacity of the energy supplied by the heat source.

Thus, operation of this circuit is parameterized from the calorific energy contained in the exhaust gas on working points of the engine so as to optimize the use of this energy. This has allowed to underline the impact of three parameters: vapour pressure level at the inlet of the expansion machine (high pressure), pressure level of this vapour at the outlet of this machine (low pressure) and flow rate of the vapour flowing through this machine, parameters that have an influence on the energy recovered at the level of this expansion machine.

However, this optimization by parameters that evolve according to the working points of the engine leads to a high variation of the fluid mass in the circuit. In fact, the fluid mass enclosed in the circuit evolves as a result of the density profile variability within the exchangers. Thus, depending on the phase change profiles in the evaporator and the condenser, the working fluid occupies more or less space.

This is all the more penalizing since the unwanted evolution of this enclosed mass has a harmful effect on the vapour pressures and flow rate applied to the expansion machine by causing them to vary in an uncontrolled manner. The main consequence thereof is to minimize the capacity of recovery of the calorific energy carried by the exhaust gas of the internal-combustion engine at the level of this expansion machine.

The present invention aims to overcome the aforementioned drawbacks by means of a device that allows to obtain a maximum efficiency on the calories recovery of the hot source, whatever the variation of the fluid mass contained in the Rankine cycle circuit.

SUMMARY OF THE INVENTION

The present invention therefore relates to a device for controlling the working fluid circulating in a closed circuit operating according to a Rankine cycle, said circuit comprising a heat exchanger for evaporation of said working fluid, swept by a hot fluid from a hot source, expansion means for expanding the working fluid in vapour form, a cooling exchanger swept by a cold fluid for condensation of the working fluid in vapour form, and a circulation and compression pump for the working fluid in liquid form, characterized in that it comprises means of managing the mass of working fluid contained in the circuit.

The management means can comprise a working fluid storage tank and selective fluid circulation means between said tank and the circuit.

The management means can control the circulation of at least part of the fluid contained in the tank towards the circuit.

The management means can control the circulation of part of the fluid contained in the circuit towards the tank.

The selective circulation means can comprise a fluid circulation line controlled by a throttling means.

A fluid circulation line can connect the tank to the inlet of the fluid circulation and compression pump.

A fluid circulation line can connect the tank to the outlet of the fluid circulation and compression pump.

The heat source can come from the exhaust gas of an internal-combustion engine.

The invention also relates to a method of controlling the working fluid circulating in a closed circuit operating according to a Rankine cycle, said circuit comprising a heat exchanger for evaporation of said working fluid, swept by a hot fluid from a hot source, expansion means for expanding the working fluid in vapour form, a cooling exchanger swept by a cold fluid for condensation of the working fluid in vapour form, and a circulation and compression pump for the working fluid in liquid form, characterized in that it consists in modifying the mass of the fluid contained in said circuit.

The method can consist in adding fluid to the working fluid already contained in said circuit.

The method can consist in introducing the fluid at the inlet of the circulation and compression pump.

The method can consist in withdrawing part of the fluid present in the circuit.

The method can consist in withdrawing the fluid at the outlet of the circulation and compression pump.

BRIEF DESCRIPTION OF THE FIGURES

Other features and advantages of the invention will be clear from reading the description hereafter, given by way of non limitative example, with reference to the accompanying figures wherein:

FIG. 1 shows a device for controlling a closed circuit operating according to a Rankine cycle, FIG. 2 illustrates the device of FIG. 1 according to a working configuration, and FIG. 3 illustrates the device of FIG. 1 according to another working configuration.

DETAILED DESCRIPTION

In FIG. 1, Rankine cycle closed circuit 10 comprises a circulation and compression pump 12 (or compressor) for a working fluid, including a rotary transmission shaft 14 controlled by a drive device such as an electric motor. This compressor comprises an inlet 18 for a working fluid in liquid form and an outlet 20 for this working fluid, also in liquid form, but compressed at high pressure.

The circuit comprises a heat exchanger 22 (or evaporator) traversed by the compressed working fluid between an inlet 24 for this liquid fluid and an outlet 26 through which the working fluid flows out of this evaporator in form of compressed vapor. This evaporator is swept by a hot fluid (symbolized by arrow Ch) coming from a heat source 28. This heat source can be of any type, such as a burner, a radiant element or others.

Advantageously, and for the rest of the description, this source comes from the exhaust gas of an Internal-combustion engine, and more particularly an engine for a motor vehicle.

This circuit also comprises expansions means 30 (or pressure regulator) receiving, through inlet 32, the working fluid in form of high pressure compressed vapour that flows out through outlet 34 in form of low pressure expanded vapour. This regulator comprises a connecting shaft 36 allowing to transmit the energy recovered to any transformer device 38 such as, for example, an electric generator connected to this shaft and allowing to supply an electric current for feeding batteries.

This regulator can be of any type, such as a piston mechanism. In the example illustrated in the figures, this regulator is an expansion turbine comprising a rotor, of bladed type for example, driven in rotation by the working fluid in vapour form.

The circuit also comprises a cooling exchanger 40 (or condenser) with an inlet 42 for the expanded low pressure vapour and an outlet 44 for the working fluid converted to liquid form after passing through this condenser. The condenser is swept by a cold fluid (arrow Fr), generally air at ambient temperature, in order to cool the expanded vapour so that it condenses and is converted to liquid.

Fluid circulation lines 46, 48, 50 and 52 allow to connect the various elements of this circuit. More precisely, line 46 connects outlet 20 of the compressor to inlet 24 of the evaporator, line 48 connects outlet 26 of this evaporator to inlet 32 of the turbine, line 50 connects outlet 34 of the turbine to inlet 42 of the condenser and line 52 connects outlet 44 of the condenser to inlet 18 of the compressor.

Finally, means 54 allowing to manage the mass of fluid enclosed in the circuit, notably by varying it, are provided on this circuit.

What is referred to as enclosed mass is the mass consisting of the fluid in liquid and vapour form in the entire circuit.

These means comprise a pressurized storage tank 56 for the working fluid in Liquid form with a preset cap 58 and selective means for circulation of the fluid between said tank and circuit 10. These selective circulation means comprise two fluid circulation lines 60, 62 carrying each a valve 64, 66.

More precisely, line 60 with its valve 64 allows to connect the zone of tank 56 below its liquid fluid level 68 to a junction point 70 with line 52 between the condenser outlet and the compressor inlet. Line 62 with its valve 66 also allows to connect the zone of tank 56 below its level 68 to another junction point 72 with line 46 between outlet 20 of compressor 12 and inlet 24 of the evaporator.

Valves 62 and 64 are controlled by any known means, such as electric motors, under the control of an arithmetic unit and more particularly of the engine calculator of the internal-combustion engine.

These fluid mass managing means allow to act upon the device through the agency of another actuator (mass of the fluid) in addition to the actuators already used in connection with the compressor speed and the turbine speed.

For simplification reasons, in the rest of the description, line 60 is referred to as <<upstream line>>, considering the direction of circulation of the fluid from the condenser to the evaporator. On the same basis, line 62 is referred to as <<downstream line>>.

Also for simplification reasons, in the rest of the description, water is referred to as the fluid circulating in the circuit. Any other phase change fluid (liquid/vapour) can however be used, including organic fluids.

Under normal operating conditions, the working fluid considered, water here, circulates in the circuit in a clockwise motion. Thus, this fluid leaves compressor 12 in liquid form at a pressure of the order of 80 bars and a temperature close to ambient temperature. This liquid is carried through line 46 to inlet 24 of the evaporator. It flows through this evaporator so as to be converted to vapour under the effect of the hot fluid Ch sweeping this evaporator and coming from source 28. The vapour flowing therefrom is at about 500° C. with a pressure of the order of 80 bars. This vapour is carried by line 48 and flows through expansion turbine 30. Through this flow, the energy transmitted to this turbine by the vapour allows shaft 36 to be driven into rotation so as to transmit to transformer device 38 the energy recovered from the exhaust gas. The expanded vapour leaving the turbine is at a temperature close to 250° C. with a pressure close to the atmospheric pressure. This expanded vapour then flows through condenser 40 where it undergoes a stage of conversion from the vapour phase to the liquid phase. The liquid, at atmospheric pressure and at ambient temperature, is then brought through line 52 to inlet 18 of compressor 12 in order to be compressed.

Under normal operating conditions allowing to recover the maximum amount of energy contained in the hot fluid from heat source 28 consisting of the exhaust gas, turbine 30 is thus traversed by the vapour at a flow rate Q with a high pressure Ph at inlet 32 and with a low pressure Pb at outlet 34.

Of course, all the parameters of the circuit for the vapour flow rate and pressures (Q, Ph and Pb) are measured by detectors (not shown in the figures) controlled by the engine calculator and/or deduced by calculation in connection with charts also contained in this engine calculator.

Thus, in case of a difference between the measured and/or calculated flow rate and/or pressures and threshold values considered to be optimal by the engine control, it is necessary to act upon the mass of fluid enclosed in the circuit in order to adjust flow rate Q and/or pressures Ph, Pb as close as possible to the optimum values. In particular, increasing the mass of fluid contained in the circuit allows to increase flow rate Q and/or pressure Pb. Besides, an additional action on the speed (volume flow rate) of the compressor and/or of the pump allows to act upon the pressure difference between Ph and Pb.

Thus, in the case where the mass of fluid of the circuit is not sufficient to obtain vapour at the evaporator outlet with a sufficient flow rate and/or pressure to recover the maximum amount of energy from source 28, the engine calculator controls the valves of management means 54 in such a way that valve 66 goes into a position where the downstream line is closed whereas valve 64 goes into a position where upstream line 60 is open (FIG. 2).

In this configuration, the working fluid present in the circuit continues to circulate and, under the impulse of the suction at the level of inlet 18 of compressor 12, part of the fluid of the tank is sucked through upstream line 60 (double arrows). This sucked fluid reaches junction point 70 and mixes with the working fluid already present in the circuit. This allows to increase the mass of liquid contained between outlet 44 of the condenser and inlet 24 of the evaporator.

As soon as the difference between the measured and/or calculated flow rate and/or pressures and the optimum values is substantially zero, the engine calculator controls valve 64 in such a way that it goes into a position where upstream line 60 is closed.

It is thus possible to obtain the desired mass of fluid allowing to have the desired vapour flow rate Q at the desired high pressure Ph at outlet 26 of evaporator 22.

Conversely, if the mass of fluid in the circuit is surplus, this consequently produces at outlet 26 of evaporator 22 vapour with too high a flow rate.

The engine calculator then controls valve 64 in such a way that it closes upstream line 60 while preventing any fluid circulation therein. This calculator also controls valve 66 in such a way that downstream line 62 is open.

Thus, under the effect of the compressor discharge at outlet 20, the working fluid divides into two parts at junction point 72. A large part of this fluid circulates in the circuit and the rest of the working fluid is sent through downstream line 662 to tank 56 into which it is fed (arrows in form of dashed line) as illustrated in FIG. 3.

Similarly, as soon as the difference between the measured and/or calculated flow rate and/or pressures and the optimum values is substantially zero, the engine calculator controls valve 66 in such a way that it goes into a position where downstream fine 62 is closed.

It is thus possible, simply by acting upon the valves, to manage the mass of working fluid contained in the circuit, at any time. This affords the advantage of recovering the maximum amount of energy from the hot source in order to convert it thereafter to another energy, rapidly usable, such as mechanical, electric energy, . . . .

The present invention is not limited to the embodiment examples described above and it encompasses any variant and equivalent covered by the invention.

Notably, using the aforementioned device with an internal-combustion engine arranged in a conventional vehicle or a hybrid vehicle can be considered.

The invention claimed is:

1. A device for controlling the working fluid circulating in a closed circuit operating according to a Rankine cycle, said circuit comprising a heat exchanger for evaporation of said working fluid, swept by a hot fluid from a hot source, expansion means with an inlet and an outlet for discharging the working fluid in vapour form, a cooling exchanger swept by a cold fluid for condensation of the working fluid in vapour form, and a fluid circulation and compression pump for the fluid in liquid form, characterized in that the device comprises a pressurized working fluid storage tank comprising a preset cap providing a preset pressure in the pressurized working fluid storage tank, the pressurized working fluid storage tank being provided outside said circuit and connected to said circuit by selective working fluid circulation means between said tank and said circuit comprising two fluid circulation lines each controlled by a throttling means, one of the fluid circulation lines connecting a zone of said tank below a level of working fluid in said tank to an inlet of said fluid circulation and compression pump and the other fluid circulation line connecting a zone of said tank below a level of working fluid in said tank to said circuit between an outlet of said fluid circulation and compression pump and said heat exchanger for evaporation of said working fluid so as to feed working fluid into said circuit or to remove working fluid from said circuit in order to obtain a desired flow rate, as well as desired pressures at said inlet and at said outlet of said expansion means, and characterized in that the working fluid in the pressurized working fluid storage tank is water in liquid form.

2. A control device as claimed in claim 1, characterized in that said hot source comes from the exhaust gas of an internal-combustion engine.

3. A control device as claimed in claim 1, characterized in that each of said throttling means is provided in a respective one of said two fluid circulation lines.

4. A control device as claimed in claim 1, further comprising an engine calculator configured to control said throttling means to add working fluid to the fluid already contained in said circuit in cases where the flow rate and/or the pressure values at the inlet and outlet of the expansion means are below a desired value and to withdraw part of the working fluid present in the circuit in cases where the flow rate and/or the pressure values at the expansion means inlet and outlet are above a desired value.

5. A method of controlling the working fluid circulating in a closed circuit operating according to a Rankine cycle, said circuit comprising a heat exchanger for evaporation of said working fluid, swept by a hot fluid from a hot source, expansion means with an inlet and an outlet for discharging the working fluid in vapour form, a cooling exchanger swept by a cold fluid for condensation of the working fluid in vapour form, and a circulation and compression pump for the working fluid in liquid form, characterized in that the method comprises modifying the mass of the working fluid contained in said circuit by feeding working fluid into the circuit from a pressurized storage tank comprising a preset cap providing a preset pressure in the pressurized working fluid storage tank, the pressurized working fluid storage tank being provided outside said circuit, through a fluid circulation line connecting a zone of said storage tank below a level of working fluid in said storage tank to an inlet of said circulation and compression pump or by removing working fluid from said circuit through a fluid circulation line connecting a zone of said storage tank below a level of working fluid in said storage tank to said circuit between an outlet of said circulation and compression pump and said heat exchanger for evaporation of said working fluid so as to feed the working fluid into the pressurized storage tank in order to obtain a desired flow rate, as well as desired pressures at the inlet and at the outlet of the expansion means so as to recover the maximum amount of energy from the heat source, and characterized in that the working fluid in the pressurized tank is water in liquid form.

6. A control method as claimed in claim 5, characterized in that the method comprises adding working fluid to the fluid already contained in said circuit in cases where the flow rate and/or the pressure values at the expansion means inlet and outlet are below said desired values.

7. A control method as claimed in claim 6, characterized in that the method comprises adding to the working fluid already contained in said circuit a working fluid contained in a storage tank.

8. A control method as claimed in claim 5, characterized in that the method comprises withdrawing part of the working fluid present in the circuit in cases where the flow rate and/or the pressure values at the expansion means inlet and outlet are above the desired values.

9. A control method as claimed in claim 5, characterized in that the heat exchanger for evaporation of said working fluid is swept by exhaust gas of an internal-combustion engine.

10. A control method as claimed in claim 5, characterized in that feeding working fluid into the circuit from a pressurized storage tank provided outside said circuit to an inlet of said circulation and compression pump comprises feeding liquid working fluid into the circuit from a pressurized storage tank provided outside said circuit to an inlet of said circulation and compression pump.

11. A device for controlling the working fluid circulating in a closed circuit operating according to a Rankine cycle, the closed circuit comprising a heat exchanger for evaporation of the working fluid, swept by a hot fluid from a hot source, a pressure regulator having an inlet and an outlet for discharging the working fluid in vapour form, a cooling exchanger swept by a cold fluid for condensation of the working fluid in vapour form, and a fluid circulation and compression pump for the fluid in liquid form, characterized in that the device comprises a pressurized working fluid storage tank comprising a preset cap providing a preset pressure in the pressurized working fluid storage tank, the pressurized working fluid storage tank being provided outside the closed circuit and connected to the closed circuit by a first fluid circulation line connecting a zone of the pressurized working fluid storage tank below a level of working fluid in the pressurized working fluid storage tank to an inlet of the fluid circulation and compression pump, a first valve to control flow of working fluid through the first fluid circulation line to selectively feed working fluid into the closed circuit in order to obtain a desired flow rate, a second fluid circulation line connecting a zone of the pressurized working fluid storage tank below a level of working fluid in the pressurized working fluid storage tank to the closed circuit between an outlet of the fluid circulation and compression pump and the heat exchanger for evaporation of the working fluid, and a second valve to control flow of working fluid through the second fluid circulation line so as to selectively remove working fluid from the closed circuit, the first and second valves being configured to be operable to obtain a desired flow rate of working fluid in the closed circuit and desired pressures at the inlet and at the outlet of the pressure regulator, and characterized in that the working fluid in the pressurized working fluid storage tank is water in liquid form.

12. A control device as claimed in claim 11, characterized in that the hot source comes from the exhaust gas of an internal-combustion engine.

13. A control device as claimed in claim 11, characterized in that the first valve is provided in the first fluid circulation line and the second valve is provided in the second fluid circulation line.

14. A control device as claimed in claim 11, further comprising an engine calculator configured to control the first and second valves to add working fluid to the fluid already contained in said circuit in cases where the flow rate and/or the pressure values at the inlet and outlet of the pressure regulator are below a desired value and to withdraw part of the working fluid present in the circuit in cases where the flow rate and/or the pressure values at the inlet and outlet of the pressure regulator are above a desired value.

* * * * *